US008723389B2

(12) United States Patent
Shim et al.

(10) Patent No.: US 8,723,389 B2
(45) Date of Patent: May 13, 2014

(54) SHEET PLATE FOR DC MOTOR

(75) Inventors: Wooseob Shim, Seoul (KR); Kyungsang Park, Seoul (KR); Goonchul Kim, Seoul (KR); Minjung Shin, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 297 days.

(21) Appl. No.: 13/231,222

(22) Filed: Sep. 13, 2011

(65) Prior Publication Data

US 2012/0062067 A1 Mar. 15, 2012

(30) Foreign Application Priority Data

Sep. 13, 2010 (KR) ........................ 10-2010-0089365
Dec. 21, 2010 (KR) ........................ 10-2010-0131201

(51) Int. Cl.
*H02K 13/00* (2006.01)

(52) U.S. Cl.
USPC .......................................... 310/239; 310/242

(58) Field of Classification Search
USPC .................. 310/238–240, 242, 245–247, 249
See application file for complete search history.

(56) References Cited

U.S. PATENT DOCUMENTS 4,112,321 A * 9/1978 Wan .............................. 310/242
4,851,730 A * 7/1989 Fushiya et al. ................ 310/249
6,664,700 B2 * 12/2003 Yamada et al. ............... 310/239
6,744,170 B1 * 6/2004 Du et al. ....................... 310/242

* cited by examiner

*Primary Examiner* — Dang Le
(74) *Attorney, Agent, or Firm* — Saliwanchik, Lloyd & Eisenschenk

(57) ABSTRACT

Disclosed is a sheet plate for a DC motor, in which a brush holder manufactured as a separate member is coupled to the sheet plate of the DC motor, thus effectively guiding movement of a brush and a pigtail, and affording good space utilization, the sheet plate including a brush holder taking a shape of a rectangular pillar to hold the brush and coupled to a first surface of the sheet plate, wherein the brush holder includes an opening formed in an upper surface of the brush holder in a longitudinal direction thereof to allow a pigtail to be taken out through the opening, and a cover portion provided above the opening to be spaced apart therefrom and formed as a plate that is long in a diametric direction, so that the pigtail is bent in a circumferential direction by the cover portion when being taken out.

13 Claims, 6 Drawing Sheets

SHEET PLATE FOR DC MOTOR

CROSS-REFERENCE TO RELATED APPLICATIONS

This application claims the benefit under 35 U.S.C. §119 of Korean Application Nos. 10-2010-0089365, filed Sep. 13, 2010, and 10-2010-0131201, filed Dec. 21, 2010, which are hereby incorporated by reference in their entirety.

BACKGROUND OF THE INVENTION

1. Field of the Invention

The present invention relates generally to a sheet plate for a DC motor and, more particularly, to a sheet plate for a DC motor, in which a brush holder manufactured as a separate member is coupled to the sheet plate of the DC motor, thus effectively guiding movement of a brush and a pigtail, in addition to affording good space utilization.

2. Description of the Related Art

Generally, a vehicle is constructed to control a driving direction thereof by manipulating a steering wheel connected to wheels. However, when resistance between the wheels and a road surface is large or obstacles to steering occur, a manipulation force is weakened, so that rapid manipulation may be difficult. In order to solve the problem, a power steering device is used. The power steering device involves a power unit to manipulate the steering wheel, thus reducing a manipulating force.

The power steering device includes an electronic control unit (ECU), a torque angle sensor (TAS), a torque index sensor (TIS), and an EPS motor.

The ECU drives the EPS motor in response to data on rotation of the steering wheel detected by the TAS or TIS. The EPS motor assists the rotation of a steering shaft which rotates in conjunction with the rotation of the steering wheel to change a driving direction of wheels, thus allowing a driver to rotate the steering wheel with a small force.

Such a power steering device includes a steering system extending from the steering wheel to both wheels, and an auxiliary power unit supplying auxiliary steering power to the steering system.

The auxiliary power unit includes a motor generating auxiliary power based on a control signal transmitted from the ECU, and a gear train transmitting auxiliary power from the motor to the steering shaft. The motor generally includes a motor shaft, a sheet plate, a commutator, a brush, a magnet, etc.

FIG. 1 is a plan view showing a conventional sheet plate.

The sheet plate 10 is a molding product shaped like a disc. A through hole 11 is formed through a central portion of the sheet plate 10 to allow a motor shaft (not shown) to pass therethrough, and brushes (not shown) are provided on a lower surface of the sheet plate 10.

Each brush is coupled to the sheet plate 10 by inserting the brush into a brush holder 20 that is coupled to the lower surface of the sheet plate 10. One end of the brush is exposed toward the through hole 11 and is connected to the commutator (not shown).

Meanwhile, a pigtail 31 is connected to each brush to cause current to flow to the commutator, and extends outwards along a predetermined guide portion formed on the brush holder 20.

Since the brush is in frictional contact with the commutator, the brush moves in the brush holder 20 in a diametric direction of the sheet plate 10. As each brush moves, the pigtail 31 moves in the diametric direction together with the brush.

Generally, the brush holder 20 is integrated with the sheet plate 10 and is made of a plastic material. As the brush 30 and the pigtail 31 move, the brush holder 20 is frequently deformed or damaged by frictional heat.

Further, the conventional sheet plate is problematic in that a space of the guide portion for guiding the movement of the pigtail 31 is small, and the guide portion is adjacent to the lower surface of the sheet plate 10, so that the pigtail 31 may be damaged.

Furthermore, it is difficult to install the brush 30 or the pigtail 31 due to a spatial problem, thus causing an inefficient production process.

Further, pigtails 31 pulled out from neighboring brush holders 20 are moved along a predetermined hole formed through the sheet plate 10 to an upper surface while being adjacent to each other. Since each pigtail 31 may move by a predetermined range by the movement of the brush, the neighboring pigtails 31 may be brought into contact with each other, thus causing an electric short circuit and malfunction.

BRIEF SUMMARY

Accordingly, the present invention has been made keeping in mind the above problems occurring in the prior art, and an object of the present invention is to provide a sheet plate for a DC motor, which is configured to hold a brush using a separate holding member, thus effectively guiding movement of a pigtail and the brush.

In order to accomplish the above object, according to one aspect of the present invention, there is provided a sheet plate for a DC motor configured to couple a brush of the DC motor to a first surface of the sheet plate, the sheet plate comprising: a brush holder taking a shape of a rectangular pillar to hold the brush therein and coupled to the first surface of the sheet plate, wherein the brush holder includes an opening formed in an upper surface of the brush holder in a longitudinal direction thereof to allow a pigtail for supplying a current to the brush to be taken out through the opening, and a cover portion provided above the opening to be spaced apart therefrom and formed as a rectangular plate that is long in a diametric direction, so that the pigtail is bent in a circumferential direction by the cover portion when being taken out. Therefore, the sheet plate of the present invention is advantageous in that the brush is supported and guided by a separate member, and the pigtail is smoothly moved.

Further, the brush holder in the sheet plate for the DC motor according to the present invention further includes a bent portion bent upwards to connect the cover portion to the upper surface of the brush holder. Thus, the brush and the pigtail are effectively supported and guided.

Furthermore, the bent portion connects the upper surface of the brush holder to an end of the cover portion in a longitudinal direction thereof, and a pigtail outlet is formed in opposite spaces between the upper surface of the brush holder and the cover portion and is long in the longitudinal direction. Therefore, the present invention provides the sheet plate that allows the arrangement of the pigtail to be easily changed according to the arrangement of parts.

The sheet plate for the DC motor according to the present invention further includes a holder seat protruding upwards from the first surface of the sheet plate to allow the brush holder to be seated thereon and supporting both sides of the brush holder. Therefore, the brush holder formed as a separate member is effectively seated on the sheet plate.

The sheet plate for the DC motor according to the present invention further includes a holder support protruding from an outer circumference on the first surface of the sheet plate and supporting an end of the brush holder. Therefore, the sheet plate can effectively support the brush holder and the brush.

Further, the holder support has a U-shaped cross-section in a diametric direction to support a wire on the outer circumference on the first surface of the sheet plate. Therefore, the present invention provides the sheet plate, which is constructed to make it easy to change an arrangement of the wire, and to avoid interfering with peripheral parts.

The brush holder further comprises a hook protruding downwards. Thereby, the brush holder is more firmly coupled to the sheet plate.

The sheet plate for the DC motor according to the present invention further includes a hook locking hole that is formed in a portion of the sheet plate brought into contact with the brush holder and corresponds to a shape and a position of the hook.

The sheet plate for the DC motor according to the present invention constructed as described above allows the pigtail to be taken out in the circumferential direction and be easily slidably guided in the diametric direction, in addition to preventing the pigtail from sagging toward a rotor assembly.

Further, the pigtail may be taken out in opposite directions, so that it can be flexibly applied to a change in arrangement, and thereby a simple structure is achieved and productivity is improved.

Furthermore, the sheet plate according to the present invention is advantageous in that a portion of taken out pigtail is located at a natural position, that is, a side of the brush holder adjacent to the rotor assembly, so that smooth coupling and movement between parts are ensured.

After the brush and the pigtail are coupled to the brush holder that is a separate member, they are coupled to the sheet plate, so that easy installation is possible even in a narrow space and space can be efficiently utilized.

Meanwhile, the pigtail is stably supported as compared to the prior art, thus preventing interference between the pigtail and the rotor assembly during movement, and preventing sparks from being generated by the interference.

In order to accomplish the above object, according to another aspect of the present invention, there is provided a sheet plate for a DC motor configured to couple a brush of the DC motor to a first surface of the sheet plate, the sheet plate comprising: a disc-shaped body, a plurality of brush holders, each of the brush holders being provided on a first surface of the body to extend long in a diametric direction thereof and to hold the brush therein; pigtails, each of the pigtails connected at a first end thereof to the brush, taken out through an opening formed in a first side of the brush holder, and inserted at a second end thereof into an outlet hole formed through the body; a partition wall protruding from the first surface of the body and extending long in the diametric direction thereof to limit a movement of each of the pigtails in a circumferential direction; and a pigtail catching portion disposed adjacent to the opening of each of the brush holders, spaced apart from the first surface of the body, and extending long toward an outer circumference of the body, thus limiting an axial movement of the pigtail. Therefore, the axial and horizontal movements of the pigtail are limited to prevent electric contact between the pigtail and other members.

The partition wall is disposed between neighboring brush holders to prevent neighboring pigtails from being brought into contact with each other. Thus, a short circuit caused by movement between neighboring pigtails can be prevented.

Further, the partition wall extends from an inner circumference of the body to a portion in which the outlet hole is formed. Therefore, a short circuit between neighboring pigtails can be effectively limited.

Further, the pigtail catching portion is disposed on each of opposite sides of the partition wall. Thus, the axial sagging of each pigtail is limited, so that undesirable contact can be effectively prevented during the arrangement of the motor.

The sheet plate for the DC motor according to the present invention further includes a stopper portion extending from an inside end of the partition wall in a circumferential direction and limiting a movement of each of the pigtails toward the inner circumference of the body. Thus, the movement of the pigtail is limited at three directions, so that a short circuit can be prevented.

Further, the stopper portion is disposed on each of opposite sides of the partition wall, and the pigtail catching portion extends from an end of the stopper portion. Thus, the pigtail support can be efficiently arranged.

Furthermore, the pigtail catching portion is parallel to each of the brush holders. Thus, the pigtail is reliably supported in an axial direction.

As described above, the present invention provides the sheet plate for the DC motor, which is constructed so that the pigtail is taken out in the circumferential direction and is easily slidably guided in the diametric direction, in addition to preventing the pigtail from sagging toward the rotor assembly.

Further, the partition wall and the pigtail catching portion can suppress the undesirable downward and lateral movement of the pigtail, thus preventing neighboring pigtails from being undesirably brought into contact with each other due to the movement of the pigtails, and thereby preventing malfunction resulting from a short circuit.

DETAILED DESCRIPTION

A sheet plate for a DC motor according to a preferred embodiment of the present invention will be described below in detail with reference to the accompanying drawings.

Figure 1:
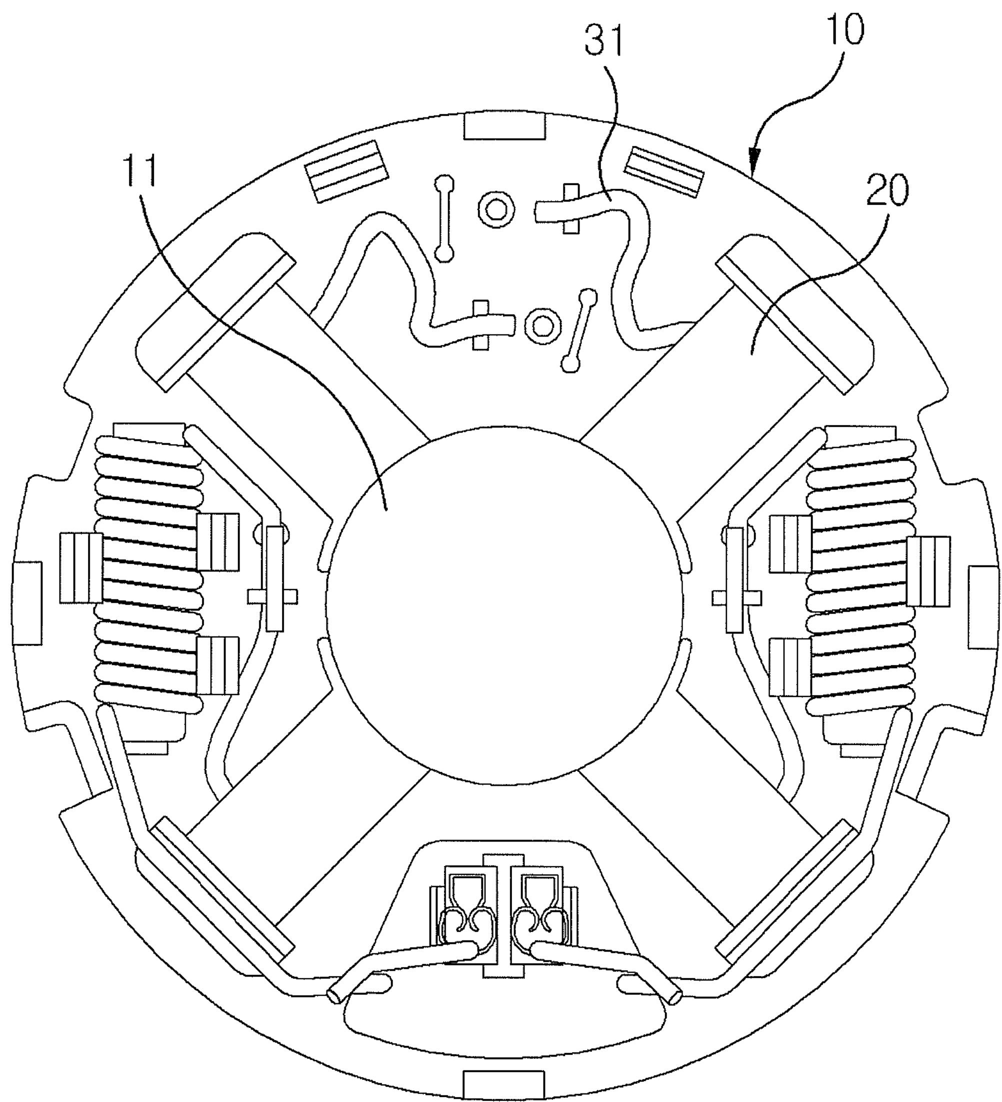
FIG. 1 is a plan view showing a conventional sheet plate.
Figure 2:
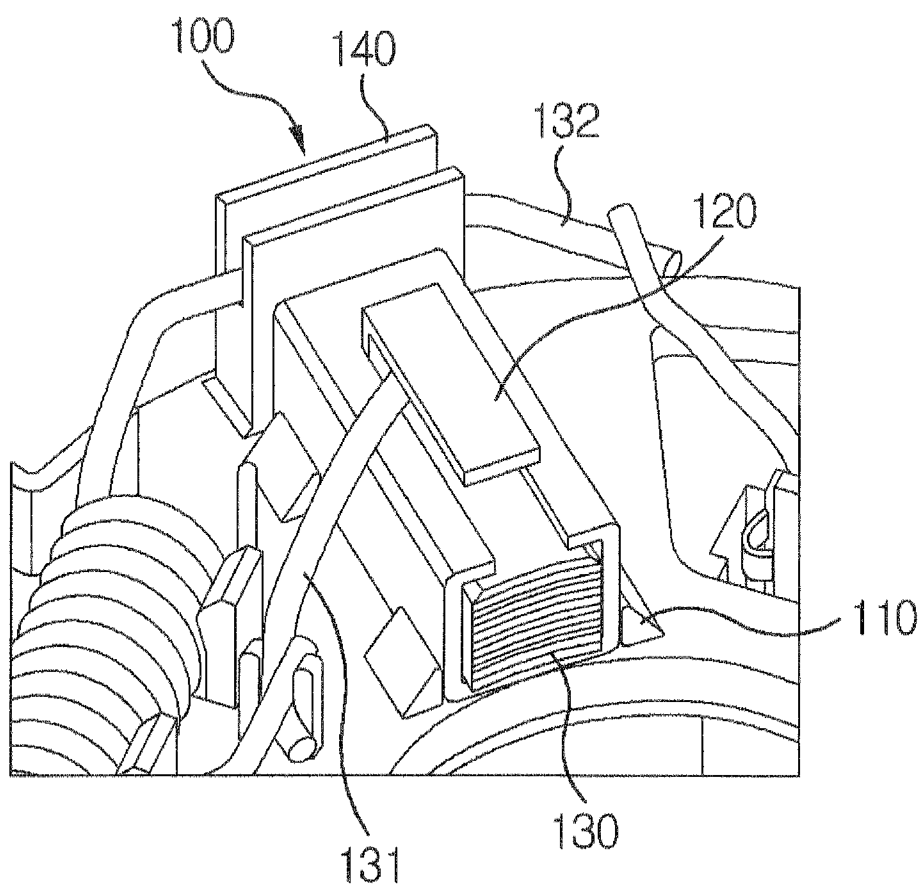
FIG. 2 is a perspective view showing a sheet plate coupled with a brush holder in accordance with the present invention.

FIG. 2 is a perspective view showing a sheet plate in accordance with the present invention.

Hereinafter, a first surface of a sheet plate 100 denotes a direction in which a rotor assembly (not shown) is coupled, namely, a surface to which a brush 130 is coupled, while an upper part or an upper portion denotes a direction facing away from the first surface. Further, a diametric direction denotes a diametric direction of the disc-shaped sheet plate 100, and a longitudinal direction denotes a diametric direction when a brush holder 120 is contacted with a communicator. Further, both sides denote left and right sides of the brush holder 120 in a circumferential direction thereof.

The sheet plate 100 is a molding product which is shaped like a disc, and is generally made of an insulating material, for example, plastics. Therefore, as described above, the sheet plate 100 may be damaged by the movement of a pigtail 131 or the brush 130 in the diametric direction.

According to the concept of the present invention, the brush 130 is seated on the sheet plate 100 via the brush holder 120 surrounding an outer surface of the brush 130.

As described above, the brush 130 is supplied with a current by a kind of leading wire that is referred to as the pigtail 131, and is electrically connected to a commutator. According to the prior art, the brush holder is installed in the sheet plate and the brush is inserted into the brush holder, thus causing a damage and a difficulty in assembly process.

In contrast, according to the present invention, after the brush 130 and the pigtail 131 are completely placed on the brush holder 120, the brush holder 120 is coupled to the sheet plate 100. This is advantageous in that operational safety is ensured and the assembling process is easy.

To be more specific, the brush holder 120 takes a shape of a rectangular pillar that is hollow therein. Thus, the brush 130 is held in the brush holder 120 in such a way as to slide in a longitudinal direction thereof.

Holder seats 110 are provided on a first surface of the sheet plate 100 to seat the brush holder 120 thereon. The holder seats 110 are provided on the first surface of the sheet plate 100 in such a way as to protrude upwards. The holder seats 110 are spaced apart from each other by an interval corresponding to a width of the brush holder 120 to support both sides of the brush holder 120.

Preferably, the brush holder 120 may be coupled to the holder seats 110 through press-fitting. Of course, the brush holder 120 may be coupled to the holder seats 110 using hooks.

Further, in the drawings, two holder seats 110 are provided on each of opposite sides of the brush holder 120. However, the number of holder seats may be selected as desired.

Preferably, a holder support 140 is provided on an outer surface of the sheet plate 100 to which the brush holder 120 is coupled, so that the holder support 140 can support the brush holder 120 while being in contact with an outer end of the brush holder 120.

Similarly to the holder seats 110, the holder support 140 protrudes upwards from the first surface of the sheet plate 100. The holder support 140 may be integrated with the sheet plate 100 during injection molding. Alternatively, the holder support 140 may be manufactured separately from the sheet plate 100 and then coupled to the sheet plate 100.

The holder support 140 preferably has an area sufficient to completely cover an end of the brush holder 120.

Meanwhile, an electro-magnetic interference (EMI) filter is connected to the sheet plate 100. The EMI filter is a device for eliminating noise of an electronic device. Particularly in the case of a motor driven power steering (MDPS) motor used in a steering device, the EMI filter is directly connected to safety, so that it is used to prevent malfunction.

Such an EMI filter wire 132 is placed on the sheet plate 100. Preferably, in order to reliably support the wire 132, the holder support 140 also functions as a wire support.

Hence, the holder support 140 has a "U"-shaped cross-section in a diametric direction, so that the wire 132 is inserted into and supported in the "U"-shaped recess. Such a construction is advantageous in that the wire can be simply supported and productivity is improved.

Figure 3:
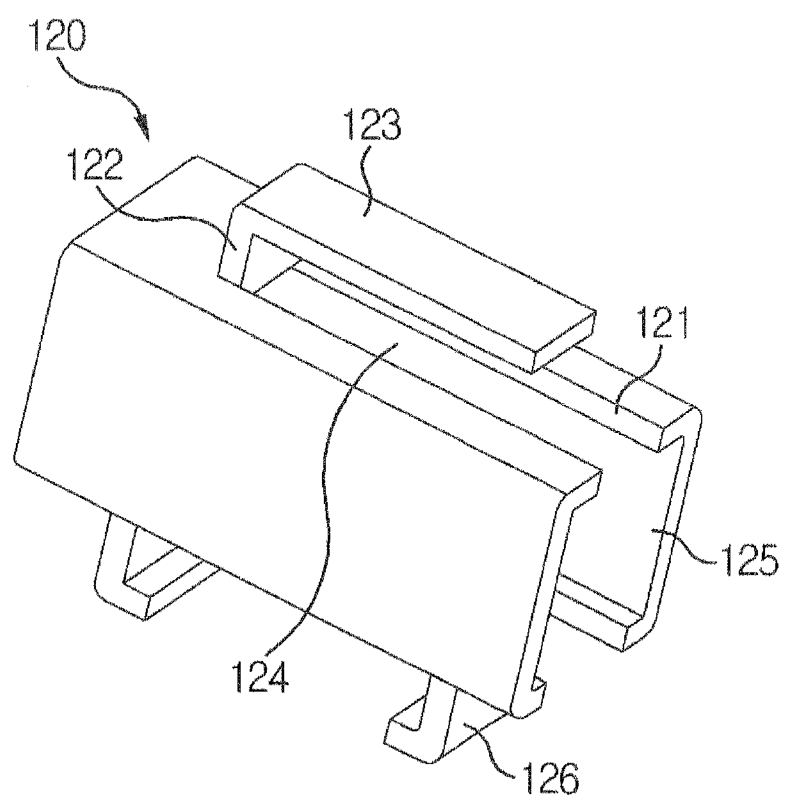
FIG. 3 is a perspective view showing the brush holder of the sheet plate in accordance with the present invention.

FIG. 3 is a perspective view showing only the brush holder. The structure of the brush holder will be described in more detail with reference to FIG. 3.

The brush holder 120 is shaped like the rectangular pillar that is hollow therein, as described above. An opening is formed in an upper surface of the brush holder 120 in a longitudinal direction thereof to allow the pigtail 131 to be taken out through the opening. Thus, as the brush 130 is inserted into a brush insertion opening 125 formed in an end of the brush holder 120, the pigtail 131 connected to the brush 130 is also inserted into the opening together with the brush 120.

Further, a cover portion 123 having a predetermined length in the longitudinal direction is provided above the opening 121 in such a way as to be spaced apart therefrom. The cover portion 123 takes a shape of a rectangular plate, and is formed to cover the opening 121 when viewed from a top.

Preferably, the cover portion 123 is integrated with the brush holder 120. Thus, a bent portion 122 is formed, which is bent to extend upwards from an end of the opening 121 in the upper surface of the brush holder 120. The bent portion 122 is bent again in a horizontal direction that is the longitudinal direction of the brush holder 120, and is thereby connected to the cover portion 123.

In the brush holder 120 constructed as described above, the pigtail 131 is taken out through the opening, and is bent in a circumferential direction of the sheet plate 100 by the cover portion 123, so that the pigtail 131 can be naturally taken out in the horizontal direction.

Therefore, the pigtail 131 is naturally guided in the diametric direction while being taken out in the horizontal direction between the cover portion 123 and the upper surface of the brush holder 120.

The opening and a pigtail outlet 124 constitute a guide part for taking out and guiding the pigtail 131.

In the prior art, the pigtail 131 is taken out while being adjacent to the first surface of the sheet plate 100. However, according to the present invention constructed as described above, the brush holder 120 causes the pigtail 131 to be taken in the pigtail outlet 124 which is placed in upper portion of the brush holder 120.

Further, a pigtail outlet 124 which is open at opposite sides thereof is formed between the cover portion 123 and the upper surface of the brush holder 120. Thus, the pigtail 131 is selectively taken out to the left or right, and is slidably guided in the longitudinal direction by the pigtail outlet 124.

This means that the arrangement of the pigtail 131 may be flexibly changed depending on the arrangement of parts that are seated on or connected to the sheet plate 100, and is advantageous in that productivity is improved.

Meanwhile, hooks 126 are preferably provided on a lower portion of the brush holder 120 so as to increase a coupling force between the brush holder 120 and the sheet plate 100.

The hooks 126 protrude downwards from the lower portion of the brush holder 120. More preferably, the hooks 126 are provided on both ends of the brush holder 120 in the longitudinal direction thereof.

Further, hook locking holes (not shown) corresponding to the hooks 126 are formed in a portion of the sheet plate 100 on which the brush holder 120 is seated.

In FIG. 3, two hooks 126 are formed in the longitudinal direction. However, if necessary, the hooks may be arranged in a widthwise direction, and a single hook may be provided. Further, the brush holder 120 may be coupled to the sheet plate 100 by a fastening method using bolts or a press-fit method using a pillar-shaped protrusion, in place of the hooks 126.

Figure 4:
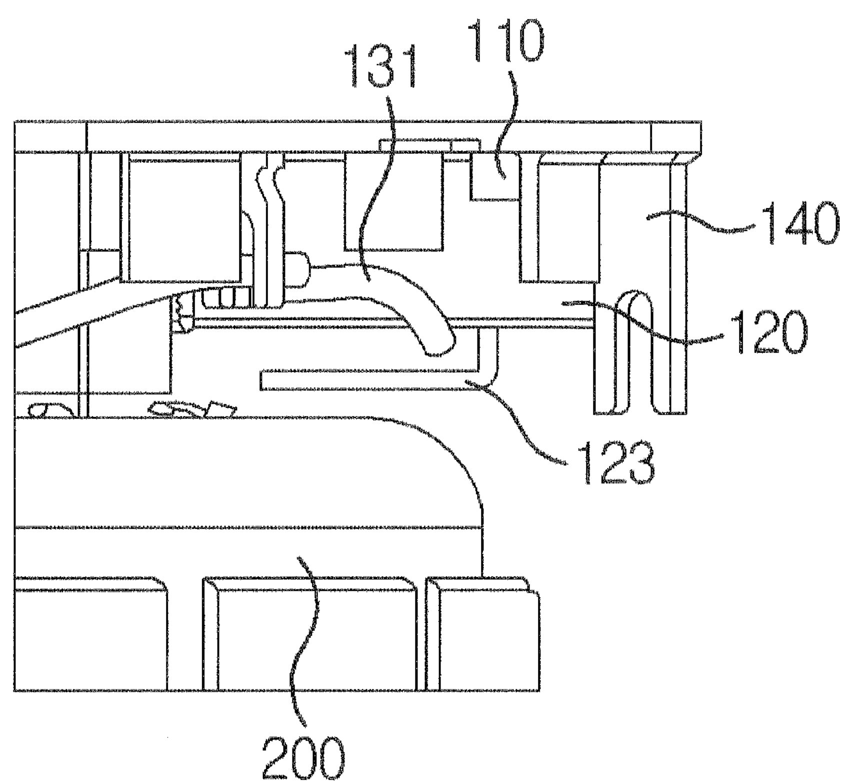
FIG. 4 is a perspective view showing a state in which the sheet plate in accordance with the present invention is assembled with a rotor assembly.

FIG. 4 is a perspective view showing a state in which a brush and a rotor assembly are coupled with the sheet plate in accordance with the present invention. Unlike FIGS. 2 and 3, the sheet plate 100 is turned upside down because the rotor assembly 200 is placed at a lower position.

In the case of using the brush holder 120 according to the present invention, the pigtail 131 is taken out in the circumferential direction and is easily slidaly guided in the diametric direction while being prevented from sagging toward the rotor assembly 200.

In the prior art, a portion of the pigtail 131 which is taken out is adjacent to the sheet plate 100. In contrast, in the sheet plate 100 according to the present invention, a portion of the pigtail 131 which is taken out is located at a natural position, that is, a side of the brush holder 120 adjacent to the rotor assembly 200, so that smooth coupling and movement between parts are ensured.

Further, after the brush 130 and the pigtail 131 are coupled to the brush holder 120 that is a separate member, they are coupled to the sheet plate 100. Thus, easy installation is possible even in a narrow space and space can be efficiently utilized.

Meanwhile, the pigtail 131 is stably supported as compared to the prior art, thus preventing interference between the pigtail 131 and the rotor assembly 200 during movement, and preventing sparks from being generated by the interference.

Figure 5:
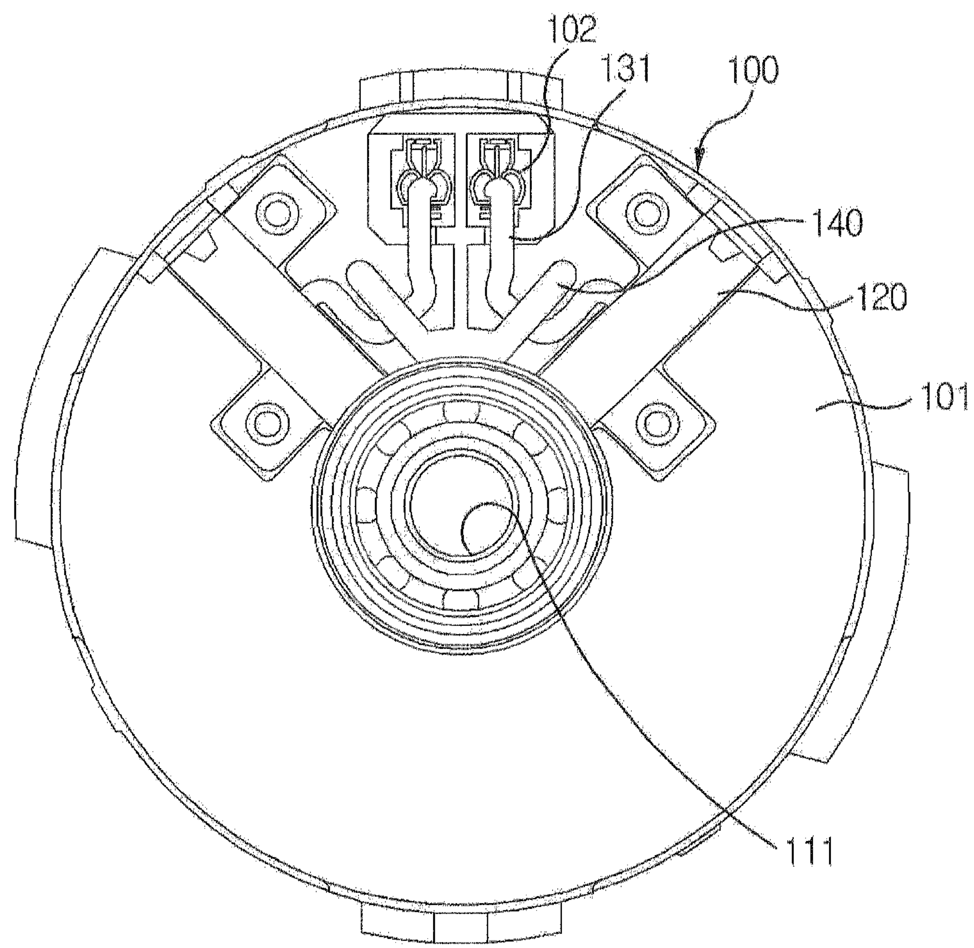
FIG. 5 is a plan view showing the sheet plate in accordance with the present invention.

FIG. 5 is a plan view showing the sheet plate in accordance with the present invention.

Meanwhile, it should be noted that the first surface is located at a lower position when the EPS motor is actually placed.

The disc-shaped body 101 of the sheet plate 100 is generally made of an insulating material, for example, plastics.

Brush holders 120 are provided on the first surface of the body 101, each of the brush holders 120 taking the shape of the rectangular pillar that is hollow therein. Thus, each brush is inserted into the corresponding brush holder 120 in such a way as to slide in the longitudinal direction, while being held in the brush holder 120.

The opening is formed in a side surface of the brush holder 120 in the longitudinal direction to allow the pigtail 131 to be taken out through the opening.

Thus, the pigtail 131 is taken out through the opening formed in the side surface of the brush holder 120, extends to an outlet hole 102 that is formed through the sheet plate 100, and is guided in the longitudinal direction of the opening, that is, the diametric direction of the sheet plate 100.

A rotating shaft of a motor passes through a through hole 111 that is formed through a central portion of the sheet plate 100, and a motor body including a rotor of the motor is coupled to the first surface of the body 101. As described above, since a portion of the pigtail 131 is disposed on the first surface of the sheet plate 100 by the movement of the brush, the pigtail 131 may move in an axial direction moving away from the first surface or in the horizontal direction, and thus interference between neighboring pigtails 131 may occur. Further, an undesirable short circuit may occur between the pigtail 131 and another conductive part.

Thus, according to the concept of the present invention, a pigtail support 140" capable of supporting a portion of the pigtail 131 is provided on the first surface of the sheet plate 100.

The pigtail support 140' is adjacent to a portion of the brush holder 120 through which the pigtail 131 is taken out. Preferably, the pigtail support 140' is formed in a space between neighboring brush holders 120 to limit a movement of each of the pigtails 131 taken out from both sides.

Figure 6:
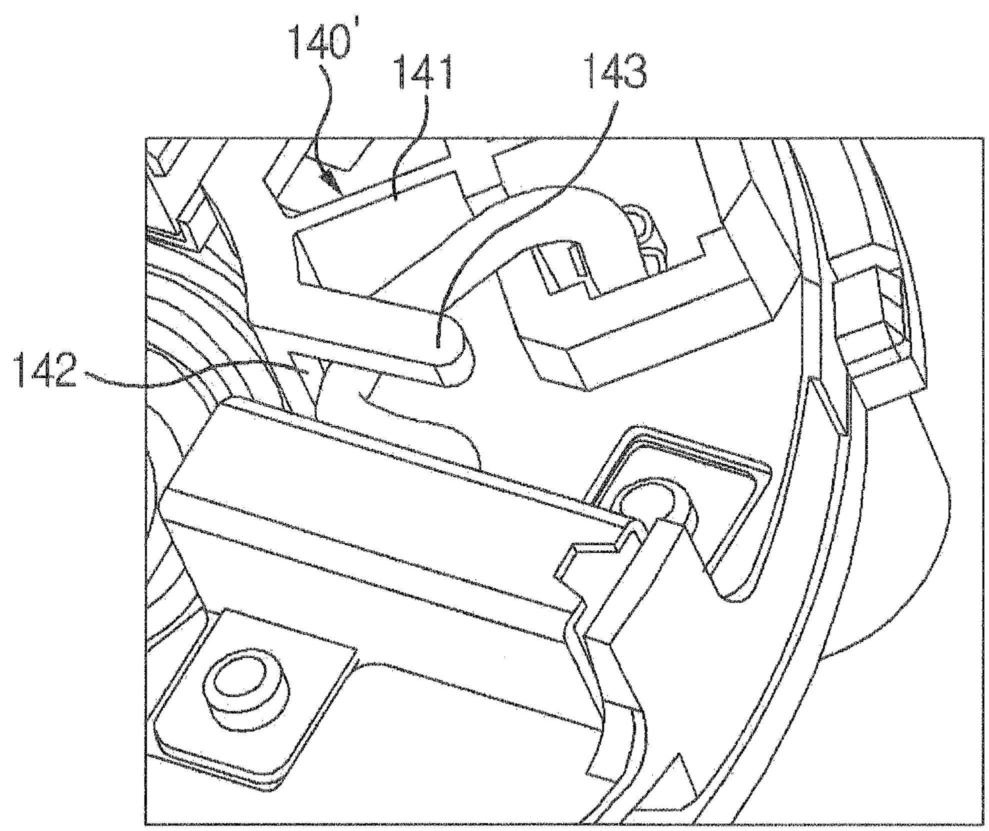
FIG. 6 is an enlarged perspective view showing a portion on which a pigtail support of the sheet plate in accordance with the present invention is disposed.

The pigtail support 140' will be described in more detail with reference to FIG. 6. FIG. 6 is an enlarged perspective view showing the first surface of the sheet plate on which the pigtail support of the present invention is disposed.

According to the present invention, the pigtail support 140' prevents the pigtail 131 from moving away from the first surface of the sheet plate 100, that is, prevents the pigtail 131 from sagging downwards when the sheet plate is coupled to the EPS motor, and prevents a lateral or circumferential movement between neighboring pigtails 131, thus preventing a short circuit.

Therefore, the pigtail support 140' includes a rib-shaped partition wall 141 that is long in the diametric direction of the sheet plate 100 and protrudes from the first surface, and a pigtail catching portion 143 that extends from the partition wall 141, is spaced apart from the first surface of the sheet plate 100, and protrudes to be long in the diametric direction.

The partition wall 141 limits the movement of the pigtail 131 in the circumferential direction, and is preferably placed between neighboring brush holders 120 to prevent neighboring pigtails 131 from being brought into contact with each other. Thus, it is preferable that the partition wall 141 extend from the through hole 111 of the sheet plate 100 to the outlet hole 102.

Further, when the lateral movement of the pigtail 131 is limited by the partition wall 141, a portion of the pigtail 131 may further move away from the first surface of the sheet plate 100 by the movement of the brush, so that there is possibility that neighboring pigtails 131 are brought into contact with each other. In order to solve the problem, the pigtail catching portion 143 is provided to limit the axial movement of the pigtail 131.

The pigtail catching portion 143 extends in a diametric direction from an upper surface of an end of the partition wall 141 which is provided on an inner circumference of the sheet plate 100. A direction in which the pigtail catching portion 143 is formed may be selected in consideration of the movement of the pigtail 131.

The pigtail catching portion 143 is nearer than the brush holder 120 in comparison with the partition wall 141, and is more preferably arranged to be parallel to the brush holder 120.

Further, the extension length of the pigtail catching portion 143 is determined in consideration of the moving distance of the pigtail 131, and is sufficient if the pigtail 131 is prevented from moving beyond a side.

Thus, the pigtail 131 is disposed in space between a lower portion of the pigtail catching portion 143 and the first surface of the sheet plate 100, thus limiting an axial movement thereof.

Meanwhile, an end of the pigtail catching portion 143 may extend directly from the end of the inner circumference of the partition wall 141. However, the end of the inner circumference of the partition wall 141 may further extend toward the brush holder 120, and the pigtail catching portion 143 may be formed on the extended portion. In this case, a stopper portion 142 is provided in the form of a partition wall to limit the movement of the pigtail 131 toward the inner circumference of the sheet plate 100.

In brief, the partition wall 141 is provided on the first surface of the sheet plate 100 between neighboring brush holders 120 in such a way as to be long in the diametric direction, and the stopper portion 142 is provided on the end of the inner circumference of the partition wall 141 in such a way as to extend toward opposite sides in the circumferential direction, and the pigtail catching portion 143 is provided on an end of the stopper portion 142 in such a way as to be spaced apart from the first surface of the sheet plate 100 and to be almost parallel to the brush holder 120.

The pigtail support 140' is made of an insulating material so as to prevent a short circuit, and is preferably formed as a molded product together with the sheet plate 100.

The partition wall 141 suppresses the circumferential movement between neighboring pigtails 131, thus preventing the pigtails 131 from being brought into contact with each other. The pigtail catching portion 143 allows each pigtail 131 to move only in a predetermined space on the first surface of the sheet plate 100, thus suppressing the axial movement thereof. The stopper portion 142 limits the movement of the pigtail 131 toward the inner circumference, thus preventing undesirable electric contact between the pigtails 131 or between the pigtail 131 and other parts.

Therefore, the pigtail support constructed as described above is advantageous in that it limits undesirable electric contact of the pigtail, thus preventing a short circuit and improving reliability of entire performance of the EPS motor coupled with the sheet plate.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A sheet plate for a DC motor configured to couple a brush of the DC motor to a first surface of the sheet plate, comprising:

a brush holder taking a shape of a rectangular pillar to hold the brush therein, and coupled to the first surface of the sheet plate, wherein the brush holder includes an opening formed in an upper surface of the brush holder in a longitudinal direction thereof to allow a pigtail for supplying a current to the brush he opening, and a cover portion provided above the opening to be spaced apart therefrom and to be taken out through t formed as a rectangular plate that is long in the longitudinal direction, so that the pigtail is bent in a circumferential direction by the cover portion when being taken out;

a holder seat protruding upwards from the first surface of the sheet plate to allow the brush holder to he seated thereon, and supporting both sides of the brush holder; and a holder support protruding from an outer circumference on the first surface of the sheet plate, and supporting an end of the brush holder, wherein the holder support has a U-shaped cross-section in a diametric direction to support a wire on the outer circumference on the first surface of the sheet plate.

2. The sheet plate as set forth in claim 1, wherein the brush holder further includes a bent portion bent upwards from the upper surface of the brush holder to be connected to the cover portion.

3. The sheet plate as set forth in claim 2, wherein the bent portion connects the upper surface of the brush holder to an end of the cover portion in a longitudinal direction thereof, and a pigtail outlet is formed in opposite spaces between the upper surface of the brush holder and the cover portion and is long in the longitudinal direction.

4. The sheet plate as set forth in claim 2, wherein the brush holder further comprises a hook protruding downwards.

5. The sheet plate as set forth in claim 1, wherein the brush holder further comprises a hook protruding downwards.

6. A sheet plate for a DC motor configured to couple a brush of the DC motor to a first surface of the sheet plate, comprising:

a disc-shaped body;

a plurality of brush holders, each of the brush holders being provided on a first surface of the body to extend long in a diametric direction thereof and to hold the brush therein;

pigtails, each of the pigtails connected at a first end thereof to the brush, taken out through an opening formed in a first side of the brush holder, and inserted at a second end thereof into an outlet hole formed through the body;

a partition wall protruding from the first surface of the body and extending long in the diametric direction thereof to limit a movement of each of the pigtails in a circumferential direction; and a pigtail catching portion disposed adjacent to the opening of each of the brush holders, spaced apart from the first surface of the body, and extending long toward an outer circumference of the body, thus limiting an axial movement of the pigtail.

7. The sheet plate as set forth in claim 6, wherein the partition wall is disposed between neighboring brush holders to prevent neighboring pigtails from being brought into contact with each other.

8. The sheet plate as set forth in claim 7, wherein the pigtail catching portion is disposed on each of opposite sides of the partition wall.

9. The sheet plate as set forth in claim 8, wherein the pigtail catching portion is parallel to each of the brush holders.

10. The sheet plate as set forth in claim 6, wherein the partition wall extends from an inner circumference of the body to a portion in which the outlet hole is formed.

11. The sheet plate as set forth in claim 6, further comprising:

a stopper portion extending from an inside end of the partition wall in a circumferential direction, and limiting a movement of each of the pigtails toward the inner circumference of the body.

12. The sheet plate as set forth in claim 11, wherein the stopper portion is disposed on each of opposite sides of the partition wall, and the pigtail catching portion extends from an end of the stopper portion.

13. The sheet plate as set forth in claim 12, wherein the pigtail catching portion is parallel to each of the brush holders.

* * * * *